United States Patent
Wiederin et al.

(10) Patent No.: US 11,566,755 B2
(45) Date of Patent: *Jan. 31, 2023

(54) ULTRACLEAN AUTOSAMPLER WITH SYRINGE DELIVERY FOR MASS SPECTROMETRY

(71) Applicant: Elemental Scientific, Inc., Omaha, NE (US)

(72) Inventors: Daniel R. Wiederin, Omaha, NE (US); Austin Schultz, Omaha, NE (US)

(73) Assignee: Elemental Scientific, Inc., Omaha, NE (US)

(*) Notice: Subject to any disclaimer, the term of this patent is extended or adjusted under 35 U.S.C. 154(b) by 0 days.

This patent is subject to a terminal disclaimer.

(21) Appl. No.: 16/591,087

(22) Filed: Oct. 2, 2019

(65) Prior Publication Data

US 2020/0103077 A1 Apr. 2, 2020

Related U.S. Application Data

(63) Continuation of application No. 15/620,092, filed on Jun. 12, 2017, now Pat. No. 10,465,853, which is a
(Continued)

(51) Int. Cl.
*G01N 30/02* (2006.01)
*F17D 3/01* (2006.01)
(Continued)

(52) U.S. Cl.
CPC ............ *F17D 3/01* (2013.01); *B01D 15/361* (2013.01); *F15D 1/06* (2013.01); *H01J 49/105* (2013.01)

(58) Field of Classification Search
CPC ....... G01N 2030/328; G01N 2030/027; G01N 2030/025
(Continued)

(56) References Cited

U.S. PATENT DOCUMENTS 3,744,219 A 7/1973 Tindle et al.
6,498,040 B1 * 12/2002 Yokoyama ........... G01N 30/468
210/198.2
(Continued)

FOREIGN PATENT DOCUMENTS

CN 101257764 A 9/2008
JP 2003214998 A 7/2003
(Continued)

OTHER PUBLICATIONS

International Search Report and Written Opinion for Application No. PCT/US2015/045851 dated Nov. 24, 2015.
(Continued)

*Primary Examiner* — Natalia Levkovich
(74) *Attorney, Agent, or Firm* — Kevin E. West; Advent, LLP

(57) ABSTRACT

A system can include a valve assembly including a first valve and a second valve in fluid communication with the first valve. The valve assembly can be configured to deliver one or more of a sample, a chemical (e.g., an acid, a base, an organic chemical, etc.), and a standard via flow of a working fluid facilitated by one or more syringe pumps. Further, the one or more of the sample, the chemical, and the standard can maintain a physical separation from the one or more syringe pumps during delivery of the one or more of the sample, the chemical, and the standard.

9 Claims, 3 Drawing Sheets

Related U.S. Application Data continuation of application No. 14/830,063, filed on Aug. 19, 2015, now Pat. No. 9,683,707.

(60) Provisional application No. 62/039,315, filed on Aug. 19, 2014.

(51) Int. Cl.
    *B01D 15/36*     (2006.01)
    *F15D 1/06*     (2006.01)
    *H01J 49/10*     (2006.01)

(58) Field of Classification Search
    USPC .................................................... 422/70, 89
    See application file for complete search history.

(56) References Cited

U.S. PATENT DOCUMENTS

| | | |
|---|---|---|
| 2005/0037517 A1 | 2/2005 | Anderson et al. |
| 2005/0053522 A1 | 3/2005 | King et al. |
| 2006/0196282 A1 | 9/2006 | Tatsumi et al. |
| 2010/0256010 A1 | 10/2010 | Ozbal et al. |
| 2010/0319736 A1 | 12/2010 | Wakamatsu et al. |
| 2013/0333491 A1 | 12/2013 | Seki et al. |

FOREIGN PATENT DOCUMENTS

| | | |
|---|---|---|
| JP | 2010008113 A | 1/2010 |
| JP | 2011503549 A | 1/2011 |
| JP | 2012088127 A | 5/2012 |
| TW | 534990 B | 6/2003 |
| WO | 03060509 A1 | 7/2003 |

OTHER PUBLICATIONS

Office Action for Chinese Patent Application No. 201580050307.5 dated Dec. 10, 2019.

Office Action for Chinese Patent Application No. 2015800503075 dated Mar. 28, 2019.

Office Action for Japanese Application No. 2017-509763, dated Sep. 3, 2019.

Office Action for Taiwan Patent Application No. 104127041 dated Dec. 19, 2018.

Office Action for Chinese Application No. 201580050307.5, dated Dec. 10, 2019.

Office Action for Japanese Patent Application No. 2020-017586, dated May 11, 2021.

Notice of Preliminary Rejection for Korean Application No. 10-2017-7005149, dated Dec. 8, 2021.

\* cited by examiner

ULTRACLEAN AUTOSAMPLER WITH SYRINGE DELIVERY FOR MASS SPECTROMETRY

CROSS-REFERENCE TO RELATED APPLICATIONS

The present application is a continuation under 35 U.S.C. § 120 of U.S. patent application Ser. No. 15/620,092, filed Jun. 12, 2017, and titled "ULTRACLEAN AUTOSAMPLER WITH SYRINGE DELIVERY FOR MASS SPECTROMETRY," which in turn is a continuation under 35 U.S.C. § 120 of U.S. patent application Ser. No. 14/830,063, filed Aug. 19, 2015, and titled "ULTRACLEAN AUTOSAMPLER WITH SYRINGE DELIVERY FOR MASS SPECTROMETRY," which in turn claims the benefit under 35 U.S.C. § 119(e) of U.S. Provisional Application Ser. No. 62/039,315, filed Aug. 19, 2014, and titled "ULTRACLEAN AUTOSAMPLER WITH SYRINGE DELIVERY FOR MASS SPECTROMETRY." U.S. patent application Ser. Nos. 15/620,092 and 14/830,063 and U.S. Provisional Application Ser. No. 62/039,315 are herein incorporated by reference in their entireties.

BACKGROUND

Inductively Coupled Plasma (ICP) spectrometry is an analysis technique commonly used for the determination of trace element concentrations and isotope ratios in liquid samples. ICP spectrometry employs electromagnetically generated partially ionized argon plasma which reaches a temperature of approximately 7,000K. When a sample is introduced to the plasma, the high temperature causes sample atoms to become ionized or emit light. Since each chemical element produces a characteristic mass or emission spectrum, measuring the spectra of the emitted mass or light allows the determination of the elemental composition of the original sample.

Sample introduction systems may be employed to introduce the liquid samples into the ICP spectrometry instrumentation (e.g., an inductively Coupled Plasma Mass Spectrometer (ICP/ICP-MS), an Inductively Coupled Plasma Atomic Emission Spectrometer (ICP-AES), or the like) for analysis. For example, a sample introduction system may withdraw an aliquot of a liquid sample from a container and thereafter transport the aliquot to a nebulizer that converts the aliquot into a polydisperse aerosol suitable for ionization in plasma by the ICP spectrometry instrumentation. The aerosol is then sorted in a spray chamber to remove the larger aerosol particles. Upon leaving the spray chamber, the aerosol is introduced into the plasma by a plasma torch assembly of the ICP-MS or ICP-AES instruments for analysis.

SUMMARY

A system can include a valve assembly including a first valve and a second valve in fluid communication with the first valve. The valve assembly can be configured to deliver one or more of a sample, a chemical (e.g., an acid, a base, an organic chemical, etc.), and a standard via flow of a working fluid facilitated by one or more syringe pumps. Further, the one or more of the sample, the chemical, and the standard can maintain a physical separation from the one or more syringe pumps during delivery of the one or more of the sample, the chemical, and the standard.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures.

DETAILED DESCRIPTION

Sample introduction systems can be employed to introduce liquid samples into ICP spectrometry instrumentation for analysis. For example, multiple in-line syringes combined with valve injection can be used to automatically deliver a sample which has been loaded into a first valve loop at a controlled rate into a nebulizer, and optionally perform other dilution and/or standard spiking. Examples include automatic inline dilution of a sample before analysis, automatic addition of internal standard solution, and sequential spiking of standard solution or other solutions to the sample for methods of addition or other applications. For the analysis of metals at extremely low levels, e.g., less than five parts per trillion (5 ppt), the presence of contamination in the syringe fluid pumped by one or more syringe pumps can cause errors in the measurement. Further, certain solutions used as standards or spiking can be detrimental to portions of sample introduction systems if allowed to contact certain regions within the system. For example, a cleanup column (e.g., a column employing an ion exchange resin to remove impurities from a working fluid, such as high purity water) can release captured impurities upon exposure to acidic solutions. If an acidic solution is utilized as a standard or a spiking solution, the acidic solution could cause the captured impurities to be released into the system resulting in error introduction. Additionally, when analyzing trace materials (e.g., trace metals) in high purity chemicals, introduction of any contaminated fluids can provide erroneous testing conditions. For example, syringe pumps utilized for controlled delivery of fluids can introduce contaminants when differing fluids are permitted to contact the syringe pump.

Figure 1:
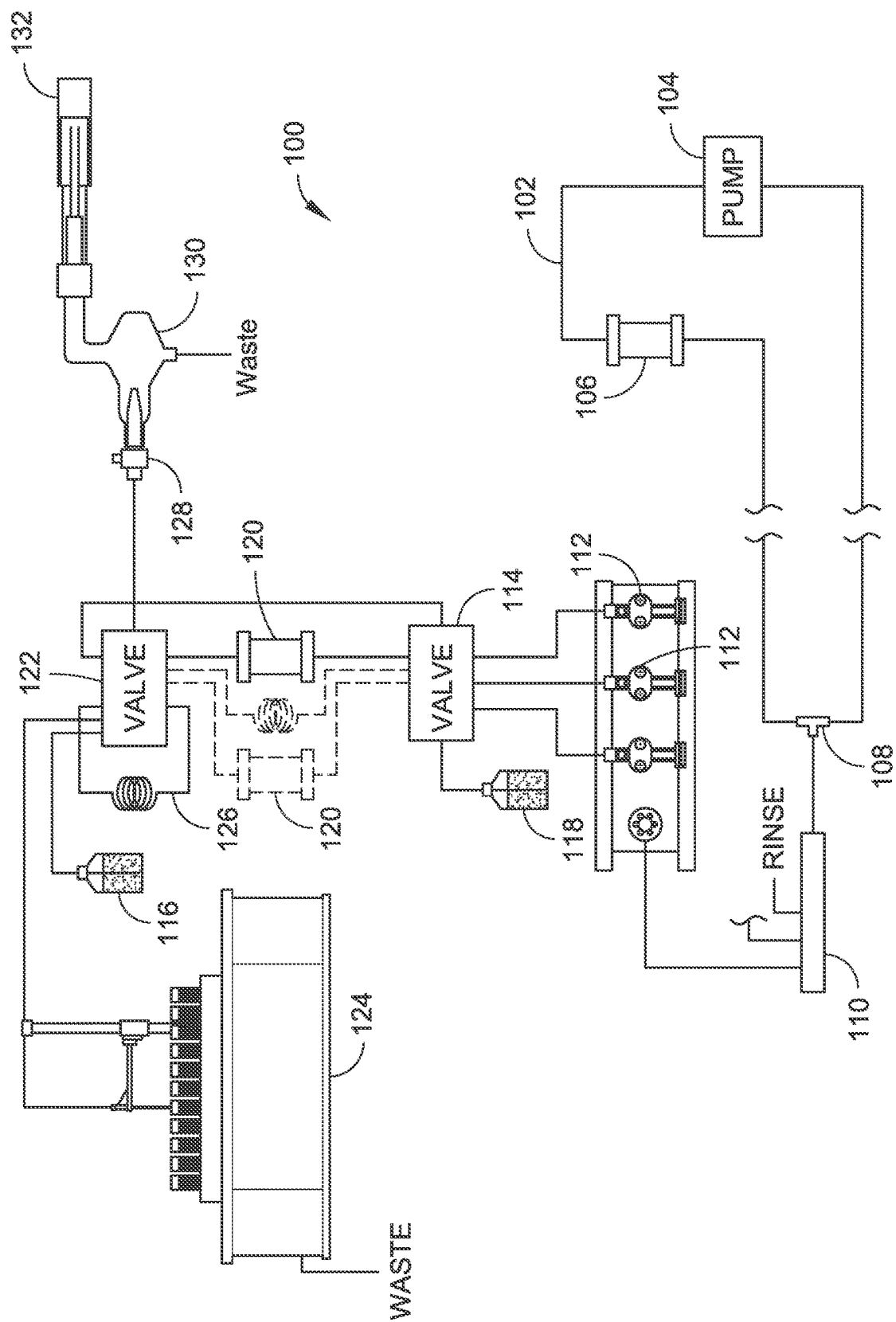
FIG. 1 is a diagrammatic illustration of a system configured to deliver cleaned fluid (e.g., to a mass spectrometry system) in accordance with an example embodiment of the present disclosure.

Accordingly, systems and methods are described that deliver cleaned fluids, such as ultra-high purity water, where the systems maintain a physical separation of sample solutions, standard solutions, and chemical (e.g., acidic, basic, organic, etc.) solutions from syringe pumps utilized to drive working fluids through the system to drive the sample solutions, standard solutions, and chemical solutions. The systems and methods described herein can include syringe-driven systems and methods for providing inline preparation of ultra-clean diluent and chemical spikes for determination of trace materials (e.g., trace metals) in high purity chemicals by ICP-MS Referring generally to FIG. 1, example systems 100 configured to deliver cleaned fluid are described. A system 100 includes a cleaner (e.g., a pump 104 and an ion exchange column 106, such as a cation exchange column) configured to clean fluid (e.g., to generate deionized (DI) water). The pump 104 and the ion exchange column 106 are positioned at a first location. The system 100 also includes a loop 102 configured to circulate cleaned fluid between the cleaner at the first location and a second location, which can be remote from the first location (e.g., several meters away from the first location, more than several meters away from the first location, etc.) or can be the same as the first location. The system 100 further includes a connection (e.g., a manifold 110) at the second location. In some embodiments, the loop 102 is connected to the manifold 110 via a tee-connection 108. The manifold 110 is configured to connect to, for example, mass spectrometry equipment to supply DI water to the mass spectrometry equipment.

In some embodiments, the manifold 110 is connected to one or more syringe pumps 112, which can be configured to supply the DI water, and possibly diluent and/or carrier 116, internal standard 118, and so forth to the mass spectrometry equipment. For example, a valve 114 (e.g., a rotary valve) is coupled with the syringe pumps 112. In some embodiments, one or more cleanup columns (e.g., additional ion exchange columns 120, such as additional cation exchange columns, and so forth) are disposed between the valve 114 and another valve 122 (e.g., a second rotary valve), which can be connected to a sampler assembly, such as an autosampler 124, for automatically collecting a sample from a number of samples contained in test tubes, and so forth. In some embodiments, a system 100 can be used to deliver DI water with a concentration of less than one part per trillion (ppt) of a contaminant element, such as sodium (Na).

The system 100 can also include a switching valve having a plurality of positions which can select the source of the syringe fluid. The syringe fluid may have a pH or ionic strength which allows contaminants in the syringe fluid to be retrained on the cleanup column. The switching valve may also select a second syringe fluid having a pH or ionic strength capable of regenerating the cleanup column.

The system 100 can also include a nebulizer 128 coupled with a cyclonic spray chamber 130 for supplying an inductively Coupled Plasma (ICP) torch 132 with sample gas, samples from the autosampler 124, the internal standard 118, the carrier 116, the DI water, and so forth. The valve 122 can be coupled with the autosampler 124, the nebulizer 128, and the valve 114. The valve 122 can receive samples from the autosampler 124, the internal standard 118, the carrier 116, and/or the DI water and supply them to the nebulizer 128. The valve 122 can also be coupled with a sample loop 126 for holding priming fluid and so forth. A peristaltic pump can be used to evacuate waste from the nebulizer 128. For example, the peristaltic pump can be connected to a drain chamber of the nebulizer 128.

Figure 2:
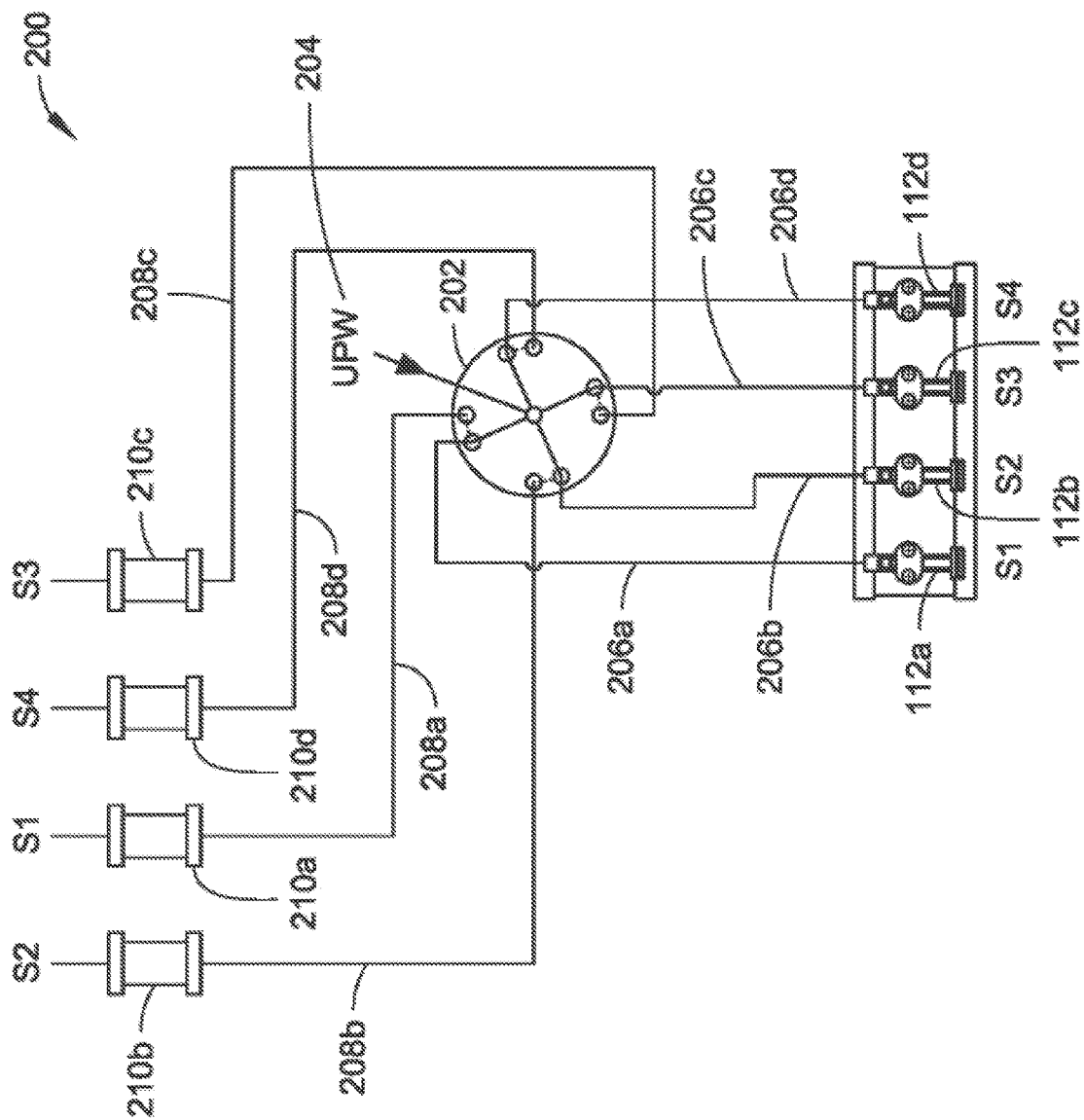
FIG. 2 is a diagrammatic illustration of a system configured to introduce cleaned fluid to portions of the system and to introduce cleaned fluid as a working fluid within the system in accordance with an example embodiment of the present disclosure.

Referring to FIG. 2, a delivery portion 200 to introduce cleaned fluid to portions of the system 100 and to introduce cleaned fluid as a working fluid within the system 100 is shown. The cleaned fluid can include, for example, ultra-high purity water, such as deionized water with a concentration of less than one part per trillion (ppt) of a contaminant element, such as sodium (Na). The delivery portion 200 includes a valve 202 (e.g., a rotary valve) in fluid communication with a plurality of syringe pumps 112 (four syringe pumps are shown, which are labeled 112a, 112b, 112c, 112d). The valve 202 is also in fluid communication with a source of cleaned fluid 204. In implementations, the source of cleaned fluid 204 is the fluid cleaned by the ion exchange column 106 shown in FIG. 1. In implementations, the source of cleaned fluid 204 is a reservoir of cleaned fluid. In implementations, a fluid having a pH or ionic strength capable of regenerating one or more cleanup columns of the system 100 can be introduced to the delivery portion 200 as the cleaned fluid 204 for distribution throughout one or more portions of the system.

The valve 202 can switch between two operating positions. In a first operating position of the valve 202, the syringe pumps 112 draw the cleaned fluid from the source of cleaned fluid 204 into the valve 202 and coupled fluid lines. For example, the syringe pump 112a can draw cleaned fluid into fluid line 206a, the syringe pump 112b can draw cleaned fluid into fluid line 206b, the syringe pump 112c can draw cleaned fluid into fluid line 206c, and the syringe pump 112d can draw cleaned fluid into fluid line 206d. In a second operating position of the valve 202, the syringe pumps drive the cleaned fluid from the fluid lines (e.g., fluid lines 206a, 206b, 206c, 206d) to other portions of the system 100, described further herein. For example, the syringe pump 112a can drive the fluid from the fluid line 206a to the fluid line 208a, the syringe pump 112b can drive the fluid from the fluid line 206b to the fluid line 208b, the syringe pump 112c can drive the fluid from the fluid line 206c to the fluid line 208c, and the syringe pump 112d can drive the fluid from the fluid line 206d to the fluid line 208d. In implementations, the valve 202 is in fluid communication with one or more cleanup columns configured to process the cleaned fluid prior to entry of the cleaned fluid into other portions of the system 100. The one or more cleanup columns can ensure the purity of the cleaned fluid before allowing the cleaned fluid to maneuver throughout portions of the system. For example, the fluid line 208a can couple between the valve 202 and a cleanup column 210a, the fluid line 208b can couple between the valve 202 and a cleanup column 210b, the fluid line 208c can couple between the valve 202 and a cleanup column 210c, and the fluid line 208d can couple between the valve 202 and a cleanup column 210d. The flow from each of the columns (210a, 210b, 210c, 210d) to the system 100 will be further described with reference to FIG. 3.

Figure 3:
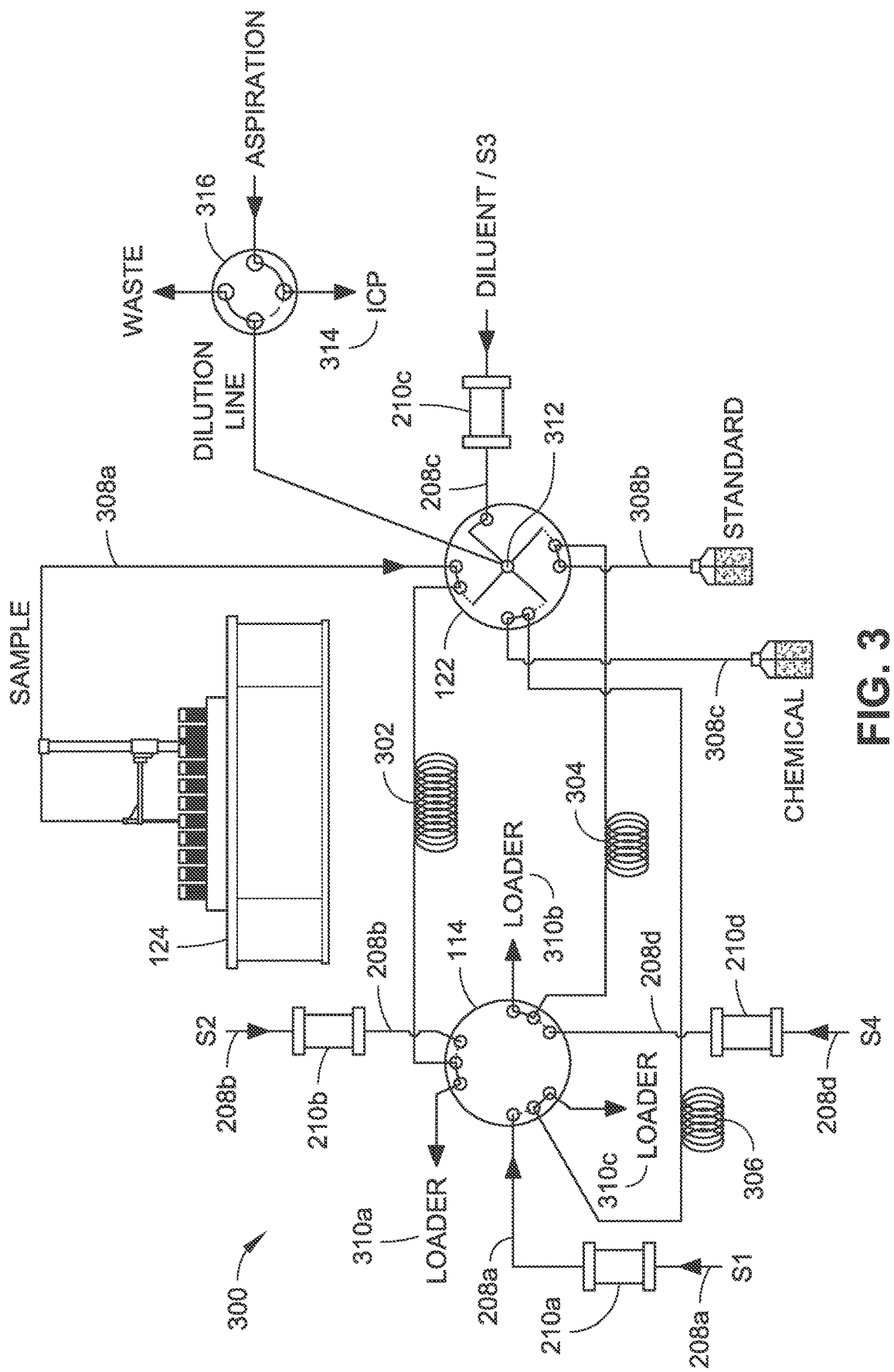
FIG. 3 is a diagrammatic illustration of a system for providing inline preparation of ultra-clean diluent and chemical (e.g., acidic) spikes for the determination of trace metals in high purity chemicals by ICP-MS in accordance with an example embodiment of the present disclosure.

Referring to FIG. 3, a valve assembly 300 for providing inline preparation of ultra-clean diluent and chemical (e.g., acidic, basic, organic, etc.) spikes (e.g., for the determination of trace metals in high purity chemicals by ICP-MS) is shown. The valve assembly 300 includes a valve (shown as valve 114) in fluid communication with another valve (shown as valve 122). In implementations, the valve 114 is configured to receive the cleaned fluid via couplings with the fluid line 208a (e.g., driven by syringe pump 112a), the fluid line 208b (e.g., driven by syringe pump 112b), and the fluid line 208d (e.g., driven by syringe pump 112d), whereas the valve 122 is configured to receive the cleaned fluid via couplings with the fluid line 208c (e.g., driven by syringe pump 112c). The valve assembly 300 includes one or more holding loops in fluid communication with the valve 114 and the valve 122. For example, FIG. 3 displays a sample loop 302 in fluid communication with (e.g., coupled between) the valve 114 and the valve 122, a standard loop 304 in fluid communication with (e.g., coupled between) the valve 114 and the valve 122, and a chemical loop 306 in fluid communication with (e.g., coupled between) the valve 114 and the valve 122. The chemical loop 306 can refer to a loop configured to hold a chemical, such as a spiking solution, within the system 100, and can include, but is not limited to an acid, a base, an organic chemical, and the like. In implementations, the sample loop 302 can correspond to the sample loop 126 described with reference to FIG. 1. In an implementation, the sample loop 302 has a volume of about 2.5 milliliters (2.5 mL), the standard loop 304 has a volume of between about 0.3 milliliters (0.3 mL) and 3.0 milliliters (3.0 mL), and the chemical loop 306 has a volume of between about 0.3 milliliters (0.3 mL) and 3.0 milliliters (3.0 mL). As used herein, the term "loop" (e.g., the sample loop 302, the standard loop 304, the chemical loop 306) can refer to a coiled fluid line, a straight fluid line, a curved fluid line, a reservoir, or other structure having a defined volume to hold and transfer fluids.

In implementations, the valve 122 is configured to receive a sample (e.g., via fluid line 308a), a standard (e.g., via fluid line 308b), and a chemical (e.g., an acid, a base, an organic chemical, etc.) (e.g., via fluid line 308c). In implementations, the standard can correspond to the internal standard 118. For example, the sample can be acquired via the autosampler 124 and drawn into the valve assembly 300 and into the sample loop 302 via a loader 310a (e.g., a pressure source or negative pressure source, such as a syringe pump or vacuum), the standard can be drawn into the valve assembly 300 and into the standard loop 304 via a loader 310b (e.g., a pressure source or negative pressure source, such as a syringe pump or vacuum), and the chemical can be drawn into the valve assembly 300 and into the chemical loop 306 via a loader 310c (e.g., a pressure source or negative pressure source, such as a syringe pump or vacuum).

In implementations, each of the valve 114 and the valve 122 are switchable between a first operating position and a second operating position. For example, in the first operating position, the sample can be drawn into the valve assembly 300 and into the sample loop 302, the standard can be drawn into the valve assembly 300 and into the standard loop 304, and the chemical can be drawn into the valve assembly 300 and into the chemical loop 306. In the second operating position, the sample is driven from the sample loop 302 via flow of the cleaned fluid (e.g., working fluid) supplied through fluid line 208b by the syringe pump 112b, the standard is driven from the standard loop 304 via flow of the cleaned fluid (e.g., working fluid) supplied through fluid line 208d by the syringe pump 112d, and the chemical is driven from the chemical loop 306 via flow of the cleaned fluid (e.g., working fluid) supplied through fluid line 208a by the syringe pump 112a. Accordingly, the sample remains physically separated from the syringe pump 112b, the standard remains physically separated from the syringe pump 112d, and the chemical remains physically separated from the syringe pump 112a, whereby only the cleaned fluid (e.g., working fluid) interacts with the sample, the standard, and the chemical to drive them from their respective holding loops.

In implementations, the sample, the standard, and the chemical are driven from the sample loop 302, the standard loop 304, and the chemical loop 306, respectively to a mixing port 312 of the valve 122, The mixing port 312 can also be in fluid communication with fluid line 208c to receive a flow of the cleaned fluid (e.g., diluent) supplied by syringe pump 112c, such as to mix with and/or diluent one or more of the sample, standard, and the chemical at the mixing port 312. In implementations, the sample, the standard, the chemical, and the diluent are received by the mixing port 312 substantially simultaneously. In implementations, the system 100 includes a timer configured to drive the syringe pump 112c at a specified time to provide the flow of the diluent to the mixing port 312, where the specified time can include at a time substantially simultaneously with one or more of the sample, the standard, and the chemical, at a time that differs from one or more of the sample, the standard, and the chemical, or so forth. In implementations, the valve 114 is coupled to a source of the diluent and is configured to load the diluent into a diluent loop coupled between the valve 114 and the valve 122 for introduction of the diluent into the mixing port 312 from the diluent loop.

The valve 122 in fluid communication with an inductively coupled plasma mass spectrometer (ICP-MS) 314. For example, the mixing port 312 can be coupled to a valve 316 (e.g., a transfer valve) configured to transfer the mixed sample solution from the mixing port 312 to the ICP-MS 314 for analysis. In implementations, the system 100 can be cleaned, drained, replenished, or the like between sample cycles. For example, the sample loop can be cleaned (e.g., via working fluid, acidic solution, basic solution, organic solution, solvent, etc.) and/or refilled between sample cycles. The standard loop 304 and the chemical loop 306 can also be refilled between sample cycles. For example, at least a portion of the standard loop 304 or the entire standard loop 304 can be refilled between sample cycles, at least a portion of the chemical loop 306 or the entire chemical loop 306 can be refilled between sample cycles, and the like. Refilling the loops can prevent stagnant solutions from lingering within the system 100, can prevent the effects of diffusion mixing in one or more of the valves of the system 100, and so forth.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A system comprising:
   a first rotary valve switchable between a first operating position and a second operating position;
   a first fluid holding line coupled to the first rotary valve;
   a second fluid holding line coupled to the first rotary valve;
   a second rotary valve in fluid communication with the first rotary valve, the second rotary valve switchable between a first operating position and a second operating position;
   a first fluid line coupled between respective ports of the first rotary valve and the second rotary valve to provide the fluid communication between the first rotary valve and the second rotary valve;
   a second fluid line coupled between respective ports of the first rotary valve and the second rotary valve to provide the fluid communication between the first rotary valve and the second rotary valve; and
   a plurality of syringe pumps including at least a first syringe pump and a second syringe pump,
   wherein the first syringe pump is in fluid communication with the first fluid holding line when each of the first rotary valve and the second rotary valve is in the second operating position, the first syringe pump is not in fluid communication with the first fluid holding line when the first rotary valve is in the first operating position, the second syringe pump is in fluid communication with the second fluid holding line when each of the first rotary valve and the second rotary valve is in the second operating position, and the second syringe pump is not in fluid communication with the second fluid holding line when the first rotary valve is in the first operating position, and wherein each of the first syringe pump and the second syringe pump is in fluid communication with a source of working fluid when the second rotary valve is in the first operating position to draw working fluid, and wherein the first syringe pump is configured to introduce drawn working fluid into the first fluid line when each of the first rotary valve and the second rotary valve is in the second operating position and the second syringe pump is configured to introduce working fluid into the second fluid line when each of the first rotary valve and the second rotary valve is in the second operating position.

2. The system of claim 1, further comprising one or more of:
a first cleanup column coupled to the first fluid line between the first rotary valve and the second rotary valve; and
a second cleanup column coupled to the second fluid line between the first rotary valve and the second rotary valve.

3. The system of claim 2, wherein one or more of the first cleanup column or the second cleanup column includes an ion exchange resin.

4. The system of claim 1, further comprising a first loader coupled to the first rotary valve, wherein the first loader is in fluid communication with the first fluid holding line and a first fluid source when the first rotary valve is in the first operating position to draw fluid from the first fluid source into the first fluid holding line.

5. The system of claim 4, wherein the first loader includes a pump.

6. The system of claim 4, wherein the first loader includes a vacuum source.

7. The system of claim 4, further comprising a second loader coupled to the first rotary valve, wherein the second loader is in fluid communication with the second fluid holding line and a second fluid source when the first rotary valve is in the first operating position to draw fluid from the second fluid source into the second fluid holding line.

8. The system of claim 1, further comprising a third rotary valve in fluid communication with the second rotary valve via a first fluid loop coupled between respective ports of the second rotary valve and the third rotary valve and via a second fluid loop coupled between respective ports of the second rotary valve and the third rotary valve, the third rotary valve switchable between a first operating position and a second operating position.

9. The system of claim 8, wherein the third rotary valve includes a mixing port configured to receive fluid from at least two different fluid sources, and wherein each of the first fluid loop and the second fluid loop is in fluid communication with the mixing port when the third rotary valve is in the first operating position, but not when the third rotary valve is in the second operating position.

* * * * *